Nov. 30, 1926.

A. H. LINDE 1,608,892

CAGE FOR BALL BEARINGS

Filed March 6, 1926      2 Sheets-Sheet 1

WITNESS:

Robt P Kitchel

INVENTOR

Andrew H. Linde

BY

Basser and Harding

ATTORNEYS

Nov. 30, 1926.

A. H. LINDE 1,608,892

CAGE FOR BALL BEARINGS

Filed March 6, 1926.   2 Sheets-Sheet 2

WITNESS:

INVENTOR

Andrew H. Linde
BY
Busser and Harding
ATTORNEYS.

Patented Nov. 30, 1926.

1,608,892

UNITED STATES PATENT OFFICE.

ANDREW H. LINDE, OF PHILADELPHIA, PENNSYLVANIA.

CAGE FOR BALL BEARINGS.

Application filed March 6, 1926. Serial No. 92,660.

This invention relates to ball-retaining separators or cages for use in ball bearings wherein the cage or spacer is placed between the balls after they are assembled between the rings in properly spaced positions in the raceways.

It is particularly well adapted to and useful in the assembly of the single row deep groove radial type of bearing, being distinguished from previously known structures, which, as a rule, are fastened together with rivets or prongs. This method is very expensive and unsatisfactory, especially when the bearings are small, as it is very difficult to insert the rivets or bend the prongs in position on account of the limited space between the rings.

My improved ball cage, which I will now describe, is a self-contained interlocking device preferably made from sheet metal and is so constructed that it may be easily and permanently inserted in the bearing, requiring no rivets or prongs to hold it in place, also having the characteristic of being symmetrical in appearance when viewed from opposite sides of the bearing.

In the drawings forming a part of this application, an illustrative example of my improved cage is shown, in which drawings—

In the preferred embodiment of my invention herein set forth, the cage is made in two parts, each complementary to the other, one part comprising a circular frame or plate $e$ which is inserted between the rings from one side and the other part comprising a similar circular frame or plate $f$ which is inserted between the rings from the other side.

Figures 1, 2:
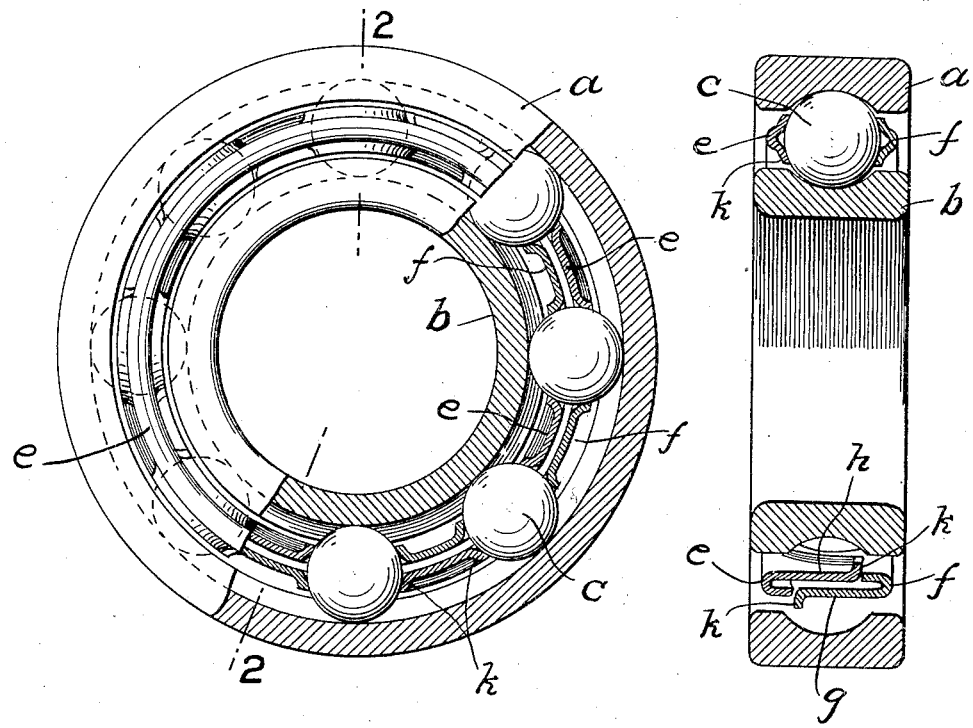
Fig. 1 is a face view, partly in section, of a complete bearing showing my improved cage in position.
Fig. 2 is a section on the line 2—2 of Fig. 1.
Figures 3, 6:
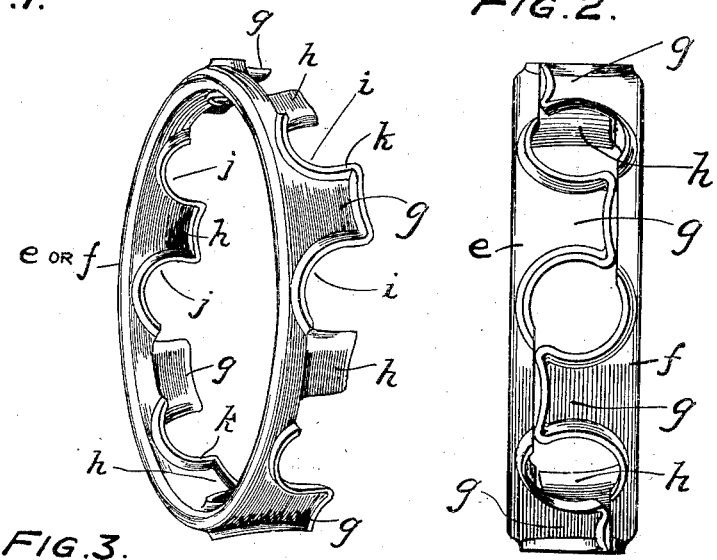
Fig. 3 is a perspective view of one member of ball cage.
Fig. 6 is a side view of the two assembled members of cage showing interlocking staggered position of spacers or wings.
Figure 4:
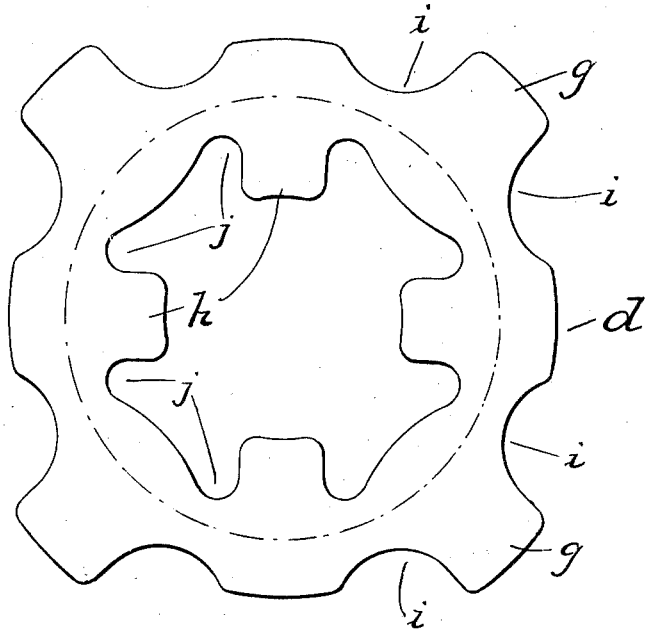
Fig. 4 is a plan view of the blank from which a cage member is formed.
Figure 5:
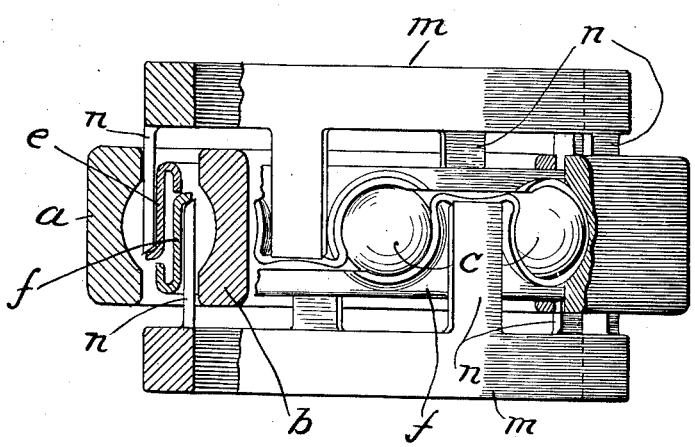
Fig. 5 is an elevation partly in section, of the ball bearing showing pocket deformers applied to cage.

Each circular plate is formed by means of suitable dies, from a flat sheet blank $d$, shown in Fig. 4. The blank has, roughly, a circular outline having spaced apart outwardly extending wings $g$ and spaced apart inwardly extending wings $h$. Wings $g$ alternate with wings $h$ in staggered circular relation. On opposite sides of each wing $g$ are concavities $i$ and on opposite sides of each wing $h$ are concavities $j$. Concavities $i$ are respectively opposite concavities $j$.

By means of suitable dies, the blank $d$ is bent or folded upon itself along a circular line extending between the outer and inner edges of the blank, thereby forming a circular plate ($e$ or $f$), U-shaped in cross-section; and at the same time the metal adjacent the edge of each fold or bend of the U-plate is upset to form flanges $k$, the flanges of the inner wall extending laterally inward and the flanges of the outer wall extending laterally outward. The metal opposite each wing is, however, unflanged; or is cut away so as to present an unflanged edge, and permit the spacer or wing on the opposite member to enter and interlock between the balls.

Two blanks, each folded upon itself as above described, and forming the folded circular plate $e$ and $f$, comprise a complete cage for holding the balls in spaced relation within the raceway.

After the balls are assembled in the raceway and spaced apart therein at some approximation to regular intervals, the plates $e$ and $f$, or cage members, are inserted between the rings $a$ and $b$ from respectively opposite sides. This is done by placing each member in such position that the corners of the wings (forming the corners at the entrance of the different pockets) engage the balls and inward pressure thereupon springs the wings sufficiently apart to permit the balls to enter the pockets; the wings then springing back to normal position and partly embracing the balls; it being noted that the width of each wing across its top is slightly greater than the width across that part of the wing which aligns with the centers of the balls. After both cage members are so positioned, the outer wings $g$ of each plate extend opposite the inner wings $h$ of the other plate. Each of such pairs of wings, in conjunction with the next adjacent such pair of wings form a multiple four wing socket or pocket embracing the balls from opposite sides.

After the cage is applied to the rings, it may be desirable to have the balls fit more securely in their pockets. This may be effected by means of deformers each comprising a ring $m$ provided with fingers $n$ adapted to engage the flanged ends of the wings $g$ and $h$ and spread the outer corners of each wing in a circumferential direction away from each other and thereby cause each pocket at its outer or open end to more effectively embrace the balls.

I claim:

1. A cage for ball bearings comprising two oppositely disposed plates having a series of pairs of wings, each pair comprising an inner wing on one plate and an outer wing on the other plate, the wings on the one plate being in staggered relation to the wings on the other plate, there being ball cavities between the inner and outer wings, the number of wings on each plate being only equal to the number of balls to be retained in the cage, the wings on one plate lying in the space between the wings on the other plate.

2. A cage for ball bearings comprising two oppositely disposed plates, each having alternate inner and outer wings, the outer wings on one plate lying opposite the inner wings on the other plate, there being a ball cavity formed between four adjacent wings, the number of wings on each plate being equal to the number of balls to be caged.

3. A cage for ball bearings comprising two oppositely disposed plates, each plate having inner and outer wings extending substantially parallel to the axis of the cage, there being ball retaining cavities between the wings of the two plates, the wings on the two plates forming two circular rows of wings, said wings being arranged to be sprung over the balls and to be held in position by the spring of the wings.

4. A cage for ball bearings comprising two oppositely disposed plates, each plate having inner and outer wings substantially parallel to the axis of the cage, the inner wings on one plate being arranged to lie opposite the outer wings on the other plate, there being ball retaining cavities between the wings of the two plates, said wings being arranged to be sprung over the balls and to be held in position by the spring of the wings.

5. A cage for ball bearings having a folded body portion comprising two ring members disposed face to face, a plurality of wings extending from each ring member substantially parallel to the axis of the cage, the wings on one ring being staggered relative to the wings on the other ring, there being ball receiving notches formed between the wings on the two rings, the combined segments of two adjacent wings forming an arc of more than 180°, and flanges extending laterally from each of the rings and wings.

6. A ball bearing comprising two members having oppositely disposed ball races therein, a plurality of balls in the races, and a ball cage having inner and outer rows of separate wings, the wings in one row being staggered relative to the wings on the other row, said wings forming open ball engaging cavities, the free ends of the wings being sprung over the balls to retain the balls in spaced relation in the race and to retain the cage in position relative to the balls.

7. A ball bearing comprising two members having oppositely disposed ball races therein, a plurality of balls in the races, a ball cage comprising an annular plate concentric with the ball race, and a plurality of separate inner and outer wings extending from the plate substantially parallel with the axis of the ball races, the inner wings being staggered relative to the outer wings, each wing having a cavity for receiving a ball, each ball being engaged by an inner and outer wing, the width of each cavity formed between each pair of wings at the center of the balls being greater than the width of said cavity near the outer ends of the wings, whereby the cage is retained in position by the engagement between the balls and the wings.

In testimony of which invention, I have hereunto set my hand, at Philadelphia, Penna., on this 2nd day of March, 1926.

ANDREW H. LINDE.